Patented Aug. 26, 1952

2,608,480

UNITED STATES PATENT OFFICE 2,608,480

PREPARATION OF VACCINE MANURES FOR AGRICULTURAL SOILS

Arthur Becker, Wetzlar, Germany

No Drawing. Application October 17, 1950, Serial No. 190,638. In Germany October 22, 1949

10 Claims. (Cl. 71—6)

The present invention relates to a process for the production of a vaccine manure for agricultural cultivation soils.

Under normal conditions many different bacteria contained in animal excrements reach the arable soil via stable manure and the like and there perform important functions on plant growth. Modern intensive methods of artificial treatment of the soil have for various reasons led to an impoverishment of cultivation soils in bacterial which are important for life. Owing to the prevailing use of artificial fertiliser the soil bacteria were not increased and in many cases even injured. The known phenomenon that vegetable materials, such for example as straw, roots and the like, which after prolonged periods in the manure heap are used as field manure, can be found almost unchanged in the soil after 1–2 years, is probably due to a shortage of cellulose- and carbohydrate-decomposing micro-organisms and putrefying bacteria. Among the cellulose and carbohydrate-decomposiing micro-organisms it is especially the proteus bacteria which are able to cause considerable decomposition of vegetable albumens. The existing shortage of bacteria in our cultivation soils may, for its part, again be the cause of the fruits of the soil lacking factors which are important for human and animal nourishment or of vitamin-like active substances being present only to an insufficient amount.

This again brings with it various bad effects on the health of the animals and moreover leads to a reduced separation of strongly vital, reproductive and functionally strong bacteria by the animal organism. Thus the vicious circle is closed and the impoverishment of the arable land in bacteria important for life is accelerated.

The object of the present invention is to arrest this faulty cycle. This is achieved by interrupting the cycle at one place and restoring it to a natural and unspoilt cycle between the animal and the vegetable world. The faulty cycle is interrupted by an intensive bacterial treatment of the cultivation soil, which is effected by colonising arable land, garden land, forestry land and virgin land, with healthy vital bacteria.

According to the invention therefore I provide a process for the production of a vaccina manure for agricultural cultivation soils in which pure-cultured strains of coli bacteria, proteus bacteria and of Streptococcus pyogenes brevis (Rosenbach) and if desired strains of lactis-aerogenes bacteria are separately cultured (for the purpose of multiplication) at first in or on solid and then in liquid media containing albumen or albumen- degradation products until a bacterial count of about 500 milliards per cc. of each medium is attained and are then combined. It is necessary that the added bacteria should conform with the criteria of the so-called "colourful line" for instance strong gas formation and reduction in neutral-red glucose agar, acid formation in litmus milk, definite indole production in trypsin broth and motility. The strains of Streptococcus pyogenes brevis employed are obtained by using a pure culture of these strains, if desired after having first subjected it to a feeding process by increased addition of decomposed albumens hardening it by alternate culture on liquid and solid culture media of usual composition and by culture under unfavourable temperature conditions, varying between abnormally high (up to 50° C.) and abnormally low (down to 5° C.) and then culturing it so long together with diphtheria bacilli, proteus bacilli, pneumococci and staphylococci until these foreign strains have been killed, whereupon the culture is washed off in the usual manner, as for example with a physiological solution of common salt. This treatment renders the Streptococcus pyogenes brevis strains especially resistant. The added strain of proteus (Bacterium proteus vulgare) is preferably deprived of its ability to swarm by prolonged culture in phenol-containing media.

It has been found to be advantageous to keep to approximately the following proportions for the mixture of the stated bacteria: ⅓ B. coli, ⅓ Streptococcus pyogenes brevis, ⅓ B. proteus vulgare. If B. lactis aerogenes is also used, the proportions for the mixture should be 1:1:1:1. The count is determined in the Liebreich counting chamber, so that after the three, or four, culture solutions have been combined about 170, or 125, milliards of each bacterium will be contained in each cc. of the mixed culture solution.

As examples of albumen—or albumen-degradation products containing culture solutions I may use peptone containing broth or distilled water containing peptones, to which 0.5% common salt and 1% dextrose have been added. It is desirable to carry out the separate cultures of the three different strains of bacteria, which result in large scale culture, at as constant a temperature as possible, and preferably at an incubator temperature of about 25–30° C. This mass culture of bacteria takes about 6–8 days. In the case of Bacterium proteus vulgare it is continued until the bacteria have completely decomposed the albumen present in the nutrient solution.

The mixed vaccine obtained by mixing the three nutrient solutions must be diluted prior to its use for manuring purposes, and this can advantageously be done with physiological common salt solution.

In this case about 10 parts of common salt solution should be used for 1 part of vaccine mixture. The solution can be sprayed as such on to the field, or it can be added to liquid stable manure before use.

By treating soils with mixed vaccines according to the invention and even without additional manuring with other substances a far-reaching enrichment of the treated soils with functionally active bacteria is achieved.

For the better understanding of the invention the following example is given only as an illustration.

*Example*

One starts with a fairly large number of strains of coli, one strain of non-swarming *Bacterium proteus vulgare* and several strains of *Streptococcus pyogenes brevis*. The two first mentioned are pre-cultured at 37° C. and the streptococcus in Roux dishes at room temperature. The *B. coli* strains are then cultured in a 2% peptone-water solution to which 0.5% common salt has been added for about 7 days.

The *B. proteus vulgare* strain is likewise cultured, separately from the former, in a 2% peptone-water solution with 0.5% common salt. The *Streptococcus pyogenes brevis* strains, which have in the above described manner, been rendered especially resistant are also grown for about 48 hours in a 2% peptone-water solution containing 0.5% common salt. After 14 days, when a count of 500 milliard bacteria per cc. of each nutrient solution has been reached, the three fluids, which contain the coli and proteus bacteria, as well as the streptococci, are poured together and grown for a further 24 hours at 37° C. The resulting mixed vaccine, in suitably diluted condition is then used for the treatment of soil.

The superiority of a soil manuring with the mixed vaccines according to the invention, over an artificial manuring is illustrated in the following table. The table is based on manuring experiments with wheat, barley, and oats, and for the purpose of comparison, the results obtained without manuring are also included.

Manuring with—

| | Mixed vaccines | | | Artificial Manure | | | Without Manure | | |
|---|---|---|---|---|---|---|---|---|---|
| | L. L. | R. L. | R. N. | L. L. | R. L. | R. N. | L. L. | R. L. | R. N. |
| | *cm.* | *cm.* | | *cm.* | *cm.* | | *cm.* | *cm.* | |
| Wheat | 16–21.5 | 9–11 | 5–7 | 13–19 | 6–8 | 3–6 | 15–20.5 | 7–9 | 3–6 |
| Barley | 19–23 | 8–12 | 4–6 | 16–21.5 | 7–10 | 4–6 | 16–23 | 6–9 | 5–6 |
| Oats | 17–19.5 | 6–7 | 4–6 | 15–18.5 | 6–7 | 4–6 | 16–18 | 5–7 | 4–6 |

L. L.=length of leaves in cm.
R. L.=length of roots in cm.
R. N.=number of roots.

The sowing took place on 30. 4. and the manuring on 5. 5. The lengths of leaves and roots as well as the number of the roots were determined on 16. 5. as the averages of about 50–60 sample plants.

What I claim is:

1. A process for the production of an inoculation manure for agricultural soils, in which pure cultured strains of *B. coli*, *B. proteus vulgare* and *Streptococcus pyogenes brevis* (Rosenbach) are separately cultured at first in or on solid and then in liquid nutrient media containing albumen or albumen degradation products for the purpose of multiplication until a bacterial count of about 500 milliards of bacteria per cc. of nutrient solution is obtained, whereupon the three nutrient solutions are combined and the resulting mixed vaccine is diluted before being applied to the cultivation soils.

2. A process as claimed in claim 1 in which the culture on the solid or liquid nutrient media takes place at a constant temperature of from 25–30° C.

3. A process as claimed in claim 1 in which the culture of the *B. proteus vulgare*, which has been artificially deprived of its power to swarm, is continued until the albumen contained in the nutrient solution has been completely decomposed.

4. A process as claimed in claim 1 in which a peptone broth or distilled water containing peptone is utilised as liquid nutrient medium.

5. A process as claimed in claim 1 in which the resulting mixed vaccine is diluted with physiological common salt solution in the proportion of 1:10.

6. A process as claimed in claim 1 in which strains of *B. Lactis aerogenes* are also used.

7. A process as claimed in claim 6 in which the culture on the solid or liquid nutrient media takes place at a constant temperature of from 25–50° C.

8. A process as claimed in claim 6 in which the culture of the *B. proteus vulgare*, which has been artificially deprived of its power to swarm, is continued until the albumen contained in the nutrient solution has been completely decomposed.

9. A process as claimed in claim 6 in which a peptone broth or distilled water containing peptone is utilised as liquid nutrient medium.

10. A process as claimed in claim 6 in which the resulting mixed vaccine is diluted with physiological common salt solution in the proportion of 1:10.

ARTHUR BECKER.

REFERENCES CITED

The following references are of record in the file of this patent:

UNITED STATES PATENTS

| Number | Name | Date |
|---|---|---|
| 947,798 | Coates | Feb. 1, 1910 |
| 1,268,563 | Grinberg | June 4, 1918 |
| 1,320,701 | Manns | Nov. 4, 1919 |
| 2,043,265 | Roeder | June 9, 1936 |
| 2,200,532 | Bond | May 14, 1940 |

OTHER REFERENCES

Buchanan, Bacteriology, Fourth Ed. (1938), The MacMillan Co., N. Y., pages 397–402.

Bergey's Manual of Determinative Bacteriology (Sixth Ed.) 1948, The Williams and Wilhens Co., Baltimore, pages 337–338.